United States Patent [19]

Audren

[11] Patent Number: 4,587,860
[45] Date of Patent: May 13, 1986

[54] GYROSCOPE APPARATUS, IN PARTICULAR A FLEXIBLY SUSPENDED AND ELECTROSTATICALLY SUPPORTED GYRO ACCELEROMETER

[75] Inventor: Jean-Thierry Audren, Les Ulis, France

[73] Assignee: Societe de Fabrication d'Instruments de Mesure, Paris, France

[21] Appl. No.: 593,765

[22] Filed: Mar. 27, 1984

[30] Foreign Application Priority Data

Apr. 1, 1983 [FR] France .................. 83 05464

[51] Int. Cl.⁴ .................. G01C 19/28; G01C 19/02
[52] U.S. Cl. .................. 74/5 F; 74/5.6 E; 74/5.6 D; 74/5.46
[58] Field of Search .......... 74/5 F, 5.46, 5.6 D, 74/5.6 E, 5 R

[56] References Cited

U.S. PATENT DOCUMENTS

| | | | |
|---|---|---|---|
| 3,845,995 | 11/1974 | Wehde | 308/10 |
| 3,902,374 | 9/1975 | Hoffman et al. | 74/5.6 D |
| 3,955,426 | 5/1976 | Klinchuch | 74/5.6 D |
| 3,987,555 | 10/1976 | Haagens et al. | 74/5 F |
| 4,061,043 | 12/1977 | Stiles | 74/5.6 |
| 4,217,787 | 8/1980 | Liebing et al. | 74/5.6 D |
| 4,259,871 | 4/1981 | Kerhoas et al. | 74/5.6 E |
| 4,326,428 | 4/1982 | Bostwick et al. | 74/5 F |
| 4,438,655 | 3/1984 | Quermann | 74/5 F |
| 4,487,083 | 12/1984 | Quermann | 74/5 F |

FOREIGN PATENT DOCUMENTS

| | | |
|---|---|---|
| 2210995 | 7/1973 | Fed. Rep. of Germany . |
| 1604768 | 1/1972 | France . |
| 2394059 | 5/1979 | France . |
| 2394060 | 5/1979 | France . |
| 1312295 | 4/1973 | United Kingdom .......... 74/5 F |

Primary Examiner—Lawrence J. Staab
Assistant Examiner—Michael D. Bednarek
Attorney, Agent, or Firm—Alan H. MacPherson; Steven F. Caserza; Richard Franklin

[57] ABSTRACT

A flexibly suspended gyroscope apparatus comprises a fixed body (100), a rotary drive shaft (200) supported in said body, and a flywheel (220) mounted on said drive shaft by a rotary joint (222). The joint serves to retain the flywheel radially and to transmit rotary drive thereto, while leaving said flywheel free to oscillate with two degrees of freedom about a central position in which the axis of the flywheel is aligned with the axis of the drive shaft. The flywheel is also free for axial translation with one degree of freedom. Axial support means (101, 102, 103, 104) are provided for applying an axial force to the flywheel by electrostatic or electromagnetic induction, and axial position detector means are provided for detecting the axial position of the flywheel, said support means being servo controlled by said detector means to maintain the flywheel in a predetermined axial position. Advantageously the same or similar means also apply precession torques to the flywheel, thereby constituting a rate gyro.

10 Claims, 4 Drawing Figures

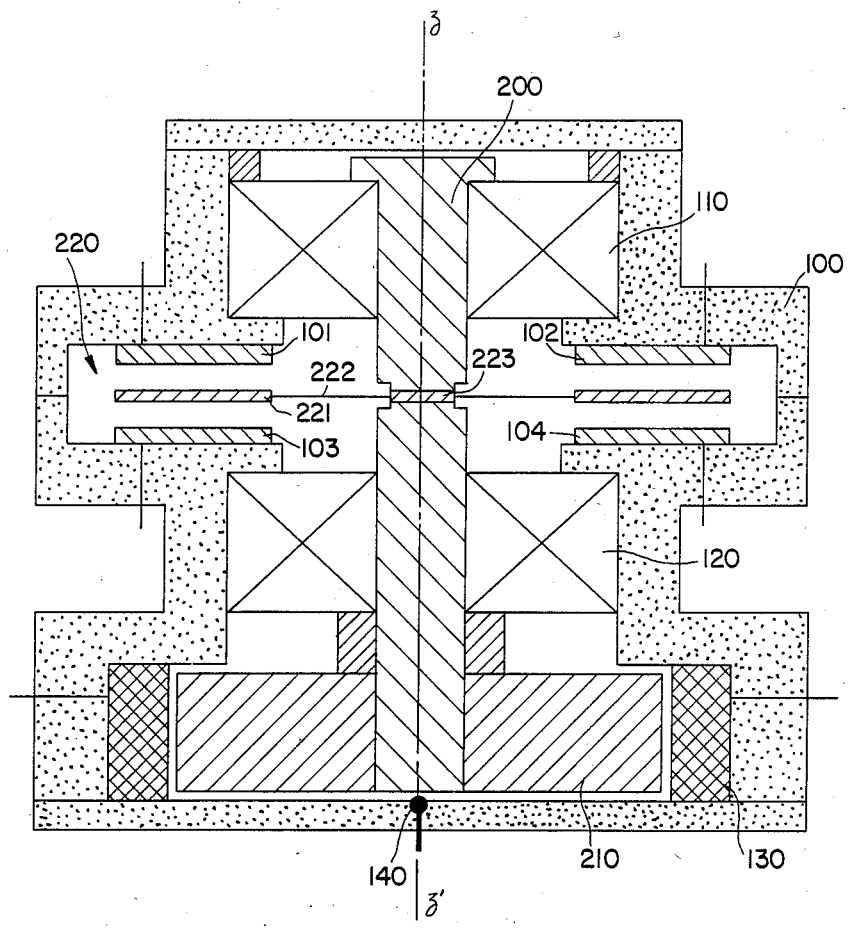
FIG_1

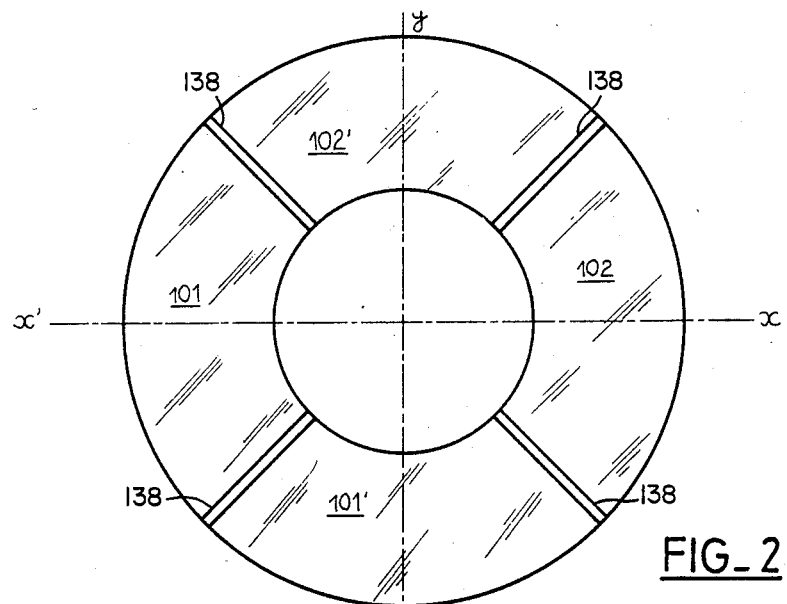
FIG_2
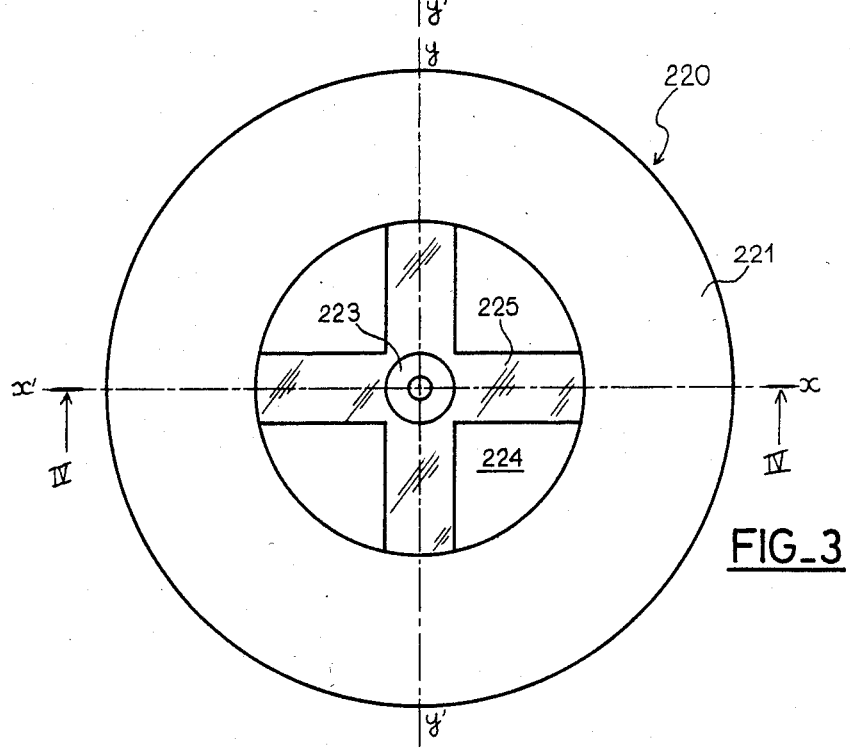
FIG_3
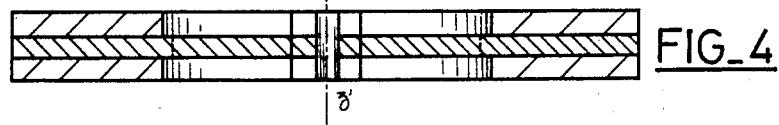
FIG_4

4,587,860

GYROSCOPE APPARATUS, IN PARTICULAR A FLEXIBLY SUSPENDED AND ELECTROSTATICALLY SUPPORTED GYRO ACCELEROMETER

The present invention relates to a flexibly suspended gyroscope apparatus.

BACKGROUND OF THE INVENTION

In apparatus of this type, the flywheel is rotated by a rotary drive shaft to which it is connected by a rotary joint. Gyroscopic torques will tend to cause the flywheel to oscillate with two degrees of freedom about a central position in which the flywheel axis is aligned with the axis of the drive shaft.

When the apparatus is intended to operate as a rate gyro, flywheel return means are additionally provided suitable for exerting a precession torque on the flywheel tending to return it to its central position. The flywheel return means may be fixed electromagnets applying an attraction force on the rotor in response to a signal representative of the inclination (in two degrees of freedom) of the flywheel axis. A rate gyro of this type is described, for example, in published French patent application No. 2 394 060 in the name of the present assignees.

More precisely, the rotary joint is generally a Hooke's joint comprising four mutually perpendicular torsion bars interconnected by a central ring in such a manner as to enable the flywheel to tilt its axis in its two degrees of freedom for oscillation. The central ring of the Hooke's joint then acts as an intermediate inertia flywheel, and the value of its inertia is chosen so that, at the speed of rotation of the flywheel, it exactly compensates the stiffness of the torsion bars. The parameters of the suspension can thus be determined in such a manner that at its nominal speed of rotation, the flywheel is not subjected to any return force due to the suspension.

In this manner, a dynamic suspension stiffness compensating function is thus combined with the purely mechanical functions of radial support and rotary drive of the flywheel via the joint.

Such a structure may be referred to as a "tuned gyro" or as a "gyro having compensated elastic suspension" and has the advantage of being very simple, which means that it is cheap, easy to make and easy to adjust. Matching the compensation boils down in practice to adjusting the moment of inertia of the intermediate flywheel which can easily be done by conventional means for balancing rotating parts.

However, miniaturizing such tuned gyros is limited by the impossibility of reducing the inertias to very low values. Contradictory constraints are encountered concerning the need to provide adequate mechanical strength for the flywheel to hold together radially (generally speaking flywheels rotate at very high speed, e.g. about 400 revolutions per second), and the need to provide a sufficiently small stiffness constant since the stiffness constant needs to be reduced with reduced flywheel mass.

The degree to which rate gyros of this type can be miniaturized has thus been limited, up to now, by the need to find a compromise between these contraints of mechanical strength and of dynamic behaviour.

Preferred embodiments of the invention provide an elastically suspended gyroscopic structure which is free from this dilemna thus enabling the inertias to be made small enough for the size of the apparatus to be greatly reduced.

SUMMARY OF THE INVENTION

To do this, the apparatus according to the invention has a flywheel which is free with one degree of freedom in axial translation, and support means are provided suitable for applying an axial force on the flywheel, said support means being electrostatic or electromagnetic and being servo controlled by means for detecting the axial position of the flywheel in such a manner as to maintain the flywheel in a predetermined axial position.

Such servo-controlled axial support of the flywheel is thus decoupled from rotary drive thereto which continues to be performed in the conventional manner. Because of the decoupling, the joint stiffness can be considerably reduced. This means that the gyroscope no longer need to be tuned, and the need for inertia compensation disappears.

When the gyro is to be used as a rate gyro, it may further include return means for exerting a precession torque on the flywheel tending to return it to its central position. Such means are servo-controlled from means for detecting angular departures of the flywheel from its central position. Thus, in addition to applying an axial force for supporting the flywheel (via the support means), a precession torque may be applied to keep the flywheel in its central position.

Advantageously, the return means include, for each degree of freedom in oscillation, at least two pairs of electrodes disposed on either side of the flywheel and fixed relative to the apparatus body, said electrodes being electrically biassed in such a manner as to induce an electric charge on at least a portion of the flywheel to exert a precession torque thereon. All the electrodes on the same side of the flywheel are disposed in the same plane, and electrodes which are diametrically opposite relative to the flywheel are connected to equal and opposite voltages in such a manner as to ensure that the overall charge on the charged portion of the flywheel is substantially zero.

This characteristic minimizes the varition of charge on the flywheel such that no net transfer of charge is required as the flywheel changes position (except for making up electrostatic losses). The power that needs supplying is thus greatly reduced, as are thermal losses; which advantages are of great importance for miniaturizing the apparatus as far as possibl.e.

Advantageously, the support means comprise at least two pairs of electrodes, with the electrodes disposed on the same side of the flywheel being disposed in the same plane and receiving voltages of equal magnitude and opposite sign so as to maintain a substantially zero charge on the charged portion of the flywheel.

Preferably, the same pairs of electrodes are used by the support means and by the return means, with the apparatus further including switching means for alternating electrode connection between the support means and the return means. The same electrodes thus serve both for supplying support (i.e. a net axial force) and for supplying rate gyro torque (i.e. precession torque).

The electrodes may also be used to perform a third function of detecting position, either angularly, axially, or both, provided that the means for detecting departures from the central position of the flywheel measure the capacitance between a conductive portion of the flywheel and at least one of the fixed electrodes of the apparatus.

It is then advantageous for the support means to include means for measuring the force applied to the flywheel and suitable for delivering an accelerometer signal representative of the acceleration of the apparatus body in the axial direction. If the mechanical characteristics (stiffness, inertia) of the flywheel and rotary joint assembly are accurately known (e.g. after being measured), the acceleration of the body of the apparatus in the axial direction can be calculated in a manner known per se from the flywheel support force, or from the flywheel axial position by which said force is servocontrolled.

Thus, without any additional mechanical apparatus, the invention can provide a combined gyro and accelerometer unit which is highly advantageous configuration for use on a stabilized platform. This is particularly true of very compact, so-called "strap-down" systems.

BRIEF DESCRIPTION OF THE DRAWINGS

An embodiment of the invention is described by way of example with reference to the accompanying drawings, in which:

FIG. 1 is a diagrammatic axial section through a gyroscope in accordance with the invention;

FIG. 2 is a plan view of the ring of electrodes used in the FIG. 1 apparatus;

FIG. 3 is a plan view of the inertia flywheel of the FIG. 1 apparatus; and

FIG. 4 is an axial section through the inertia flywheel of FIG. 3 along a line IV—IV.

MORE DETAILED DESCRIPTION

FIG. 1 shows an apparatus body 100 supporting a rotary drive shaft 200 by means of a pair of bearings 110, 120. The shaft 200 is driven by a synchronous motor having a stator 130 fixed to the body 100 and a rotor 210 fixed to the shaft 200.

The shaft 200 drives rotary equipment 220 comprising an inertia flywheel 221, a rotary joint 222 and a hub 223. The rotary equipment is described in greater detail below, with reference to FIGS. 3 and 4.

A series of electrodes are provided (101 to 104 being visible in FIG. 1) which use electrostatic effects to apply an axial support force on the flywheel 221 and also to apply precession torques thereto for returning it to a central position and for measuring the angular and axial departures of the flywheel from said central position.

To do this, the electrodes which are fixed to the apparatus body 100 are disposed in two rings on either side of the flywheel. Each ring is divided into four equal sectors which are electrically insulated from one another. FIG. 2 shows the upper ring for example having four sectors 101, 102, 101' and 102' separated by insulating gaps 138. The particular geometry shown for the electrodes (a ring of relatively large sectors separated by narrow gaps) is not the only possible geometry. However, it is one of the most advantageous when the annular shape of the inertia flywheel 221 is taken into account.

An electrical voltage can be applied to each electrode for creating a force of attraction with the flywheel. Since the flywheel is charged by electrostatic induction the force which appears is always an attractive force regardless of the sign of the applied voltage.

In the first place, the system of electrostatic forces serves to support the flywheel by applying an axial force thereto. Applying a positive voltage to the electrode 101 and a negative voltage to the electrode 102 will cause an axial force directed towards the top of the figure to be applied to the flywheel. To direct the force towards the bottom of the figure, the same voltages would need to be applied to the electrodes 103 and 104 respectively.

This method of applying voltages to the electrodes (ie. a positive voltage to the electrode 101 and a negative voltage to the electrode 102 or vice versa) is more advantageous than applying voltages of the same sign to both electrodes, since if that is done, each time the flywheel moves away from its central position an overall variation in charge is produced which causes current to flow and thus give rise to energy losses. In contrast, in the proposed configuration, charge only moves from one part of the flywheel to another and the overall flywheel charge remains zero.

In the second place, the electrodes serve to apply the necessary precession torques to the flywheel for returning it to its central position. Given the two degrees of freedom provided by the flywheel pivot, the precession torques need to be applied about two perpendicular axes. That is why each ring is provided with four sectors such as 101, 102 and 101' and 102' which are identical in pairs and at 90° to one another. The electrodes 101 and 102 are used in combination with identically disposed electrodes 103 and 104 on the other side of the flywheel for applying a torque about an axis Y'Y. Similarly, the electrodes 101' and 102' together with corresponding electrodes in the other ring apply torque about an axis X'X at right angles to the axis Y'Y. The following description is limited to applying torque about the Y'Y axis, but clearly exactly the same principles apply to applying torque about the X'X axis.

When it is desired to apply a torque which is clockwise in FIG. 1, a positive voltage is applied to the electrode 102 and a negtive voltage is applied to the diametrically opposite electrode 103 which is also on the other side of the flywheel. The force aplied by both voltages is an attractive force as explained above, hence the need to use electrodes on opposite sides of the flywheel. Also as explained above, the applied voltages are advantageously of opposite sign in order to keep the net charge on the flywheel to zero, thus avoiding setting lossy electric currents each time the flywheel departs from its equilibrium position. Voltages of the same sign could never-the-less be applied to the electrodes 102 and 103 if applying the precession torque were the only important criterion.

A torque in the opposite direction can be obtained by applying two voltages of equal magnitude (and advantageously of opposite sign) to the electrodes 101 and 104.

In the third place, the electrodes can be used to detect the position of the flywheel by measuring the capacitance between the flywheel acting as a moving electrode and at least one of the electrodes fixed to the body of the apparatus. By measuring the capacitance corresponding to the various different electrodes it is possible, in known manner, to obtain signals representative both of the axial position and of the angular position of the flywheel, which signals are directly usable for servo control of the support means and for closing the rate gyro feed-back loop.

In order to make such capacitance measurements possible, the inertia flywheel 221, the rotary joint 222, the hub 223 and the shaft 220 must be electrically conductive and must be electrically connected to one another and to a fixed terminal on the apparatus, e.g. by means of a rotating contact 140. This electrical connection is also desirable for the functions of providing support and precession torque in order to maintain the flywheel at a constant potential, e.g. ground potential.

FIGS. 3 and 4 show the rotary equipment 220 in greater detail.

As mentioned above, axial support or lift is provided by the electrodes, so the rotary joint is required only to hold the flywheel radially and to drive it in rotation. Further, since there is no need to "tune" the gyro, the stiffness of the joint can be chosen to be as low as possible in torsion while being adequate against forces exerted in the plane of the flywheel (e.g. due to the apparatus being accelerated hard in the radial direction).

It is thus possible to use a very thin metal membrane for the joint (in FIG. 4 its thickness has been deliberately exaggerated), e.g. made of aluminum alloy. In order to reduce the membrane's torsion stiffness, it may have openings 224 made therein, leaving four spokes 225 connecting the hub 223 to the flywheel 221.

I claim:

1. A flexibly suspended gyroscope apparatus comprising a fixed body, a rotary drive shaft supported in said body, and a flywheel mounted on said drive shaft by a rotary joint, said joint serving to retain the flywheel radially and to directly transmit rotary drive thereto, while leaving said flywheel free to oscillate with two degrees of freedom about a central position in which the axis of the flywheel is aligned with the axis of the drive shaft, the improvement wherein said flywheel is also free for axial translation with one degree of freedom, wherein support means are provided for applying an axial force to the flywheel by electrostatic or electromagnetic induction, and wherein axial position detector means are provided for detecting the axial position of the flywheel, said support means being servo controlled by said detector means to maintain the flywheel in a predetermined axial position.

2. Apparatus according to claim 1, further including flywheel electrostatic or electromagnetic return means suitable for exerting a precesion torque thereon tending to return the flywheel to its central position, said return means being servo controlled by means for detecting angular departures of the flywheel from its central position.

3. Apparatus according to claim 2, wherein said return means comprise at least two pairs of electrodes for each degree of freedom in oscillation, said pairs of electrodes being disposed on either side of the flywheel and being fixed relative to the body of the apparatus, said electrodes being electrically biassed in such a manner as to induce charge on at least a portion of the flywheel in order to exert a precession torque thereon, all the eectrodes disposed on the same side of the flywheel being situated in the same plane, and diametrically opposite electrodes on opposite sides of the flywheel being connected to receive potentials of equal magnitude an opposite sign in order to keep the total overall charge on the charged portion of the flywheel substantially zero.

4. Apparatus according to claim 1, wherein the support means comprise at least one pair of electrodes disposed on either side of the flywheel and fixed relative to the body of the apparatus, said electrodes being electrically biased in such a manner as to induce charge on at least a portion of the flywheel in order to exert an axially directed supporting force thereon.

5. Apparatus according to claim 4, wherein the support means comprise at least two pairs of electrodes with all the electrodes disposed on the same side of the flywheel being situated in the same plane and being connected to receive potentials of equal magnitude and opposite sign in order to keep the total overall charge on the charged portion of the flywheel substantially zero.

6. Apparatus according to claim 2 or claim 4, wherein said pairs of electrodes are common both to the support means and to the return means, the apparatus further including means for switching said electrodes to alternate between receiving signals from said support means and from said return means.

7. Apparatus according to claim 2 wherein said means for detecting the axial position of the flywheel and said means for detecting angular departures of the flywheel relative to its central position are constituted by means for measuring the capacitance between a conductive portion of the flywheel and at least one of the electrodes fixed to the apparatus.

8. Apparatus according to claim 1, wherein the rotary joint comprises a flat member of substantially constant thickness connecting the flywheel to a drive hub which is fixed to the drive shaft, said flywheel being annular, and said flywheel, said flat member, said hub and said shaft being electrically conductive and being electrically connected to one another and to a rotating connection to the drive shaft.

9. Apparatus according to claim 8, wherein said flat member of the rotary joint includes openings symmetrically disposed about its center.

10. Apparatus according to claim 1, wherein said support means further include means for measuring the axial force applied to the flywheel and suitable for delivering an accelerometer signal representative of the acceleration of the apparatus body in the axial direction.

* * * * *